(12) United States Patent
Limondin et al.

(10) Patent No.: US 8,041,554 B1
(45) Date of Patent: Oct. 18, 2011

(54) METHOD AND SYSTEM FOR THE DEVELOPMENT OF HIGH-ASSURANCE MICROCODE

(75) Inventors: Philippe M. T. Limondin, Cedar Rapids, IA (US); T. Douglas Hiratzka, Coralville, IA (US); Michael W. Whalen, Edina, MN (US); David S. Hardin, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 844 days.

(21) Appl. No.: 11/810,609

(22) Filed: Jun. 6, 2007

(51) Int. Cl.
G06F 9/45 (2006.01)
(52) U.S. Cl. ........................................................ 703/22
(58) Field of Classification Search ............... 703/22, 703/27; 714/28
See application file for complete search history.

(56) References Cited

U.S. PATENT DOCUMENTS

| | | | | |
|---|---|---|---|---|
| 6,625,759 | B1* | 9/2003 | Petsinger et al. | 714/28 |
| 7,139,936 | B2* | 11/2006 | Petsinger et al. | 714/28 |
| 7,225,417 | B2* | 5/2007 | Clarke et al. | 716/5 |
| 2004/0039966 | A1* | 2/2004 | Petsinger et al. | 714/28 |
| 2006/0247907 | A1* | 11/2006 | Qadeer et al. | 703/22 |
| 2007/0260445 | A1* | 11/2007 | Vismane et al. | 703/24 |

OTHER PUBLICATIONS

Tripakis et al., Translating Discrete-Time Simulink to Lustre, Nov. 2005, ACM Transactions on Embedded Computing Systems, vol. 4, No. 4, pp. 779-818.*
Greve et al., Evaluatable, High-Assurance Microprocessors, 2002, Rockwell Collins Advanced Technology Center.*
Greve et al., A Summary of Intrinsic Partitioning Verification, 2004, Rockwell Collins Advanced Technology Center.*
Scaife et al., Defining and Translating a "Safe" Subset of Simulink/Stateflow into Lustre, Sep. 27-29, 2004, ACM, EMSOFT'04, Pisa, Italy.*

* cited by examiner

*Primary Examiner* — Paul Rodriguez
*Assistant Examiner* — Aniss Chad
(74) *Attorney, Agent, or Firm* — Daniel M. Barbieri

(57) ABSTRACT

The present invention is a methodology for developing high-assurance microcode. The method may comprise one or more of the following steps: (a) receiving a plurality of requirements detailing intended behavior of microcode (b) creating a model of microcode behavior; (c) generating microcode based on the model; (d) generating test cases based on the model; (e) simulating the behavior of the microcode; (f) translating the model into a verification tool-specific format; and (g) formally verifying the model using a verification tool.

22 Claims, 1 Drawing Sheet

METHOD AND SYSTEM FOR THE DEVELOPMENT OF HIGH-ASSURANCE MICROCODE

CROSS-REFERENCE TO RELATED APPLICATION

The present application is related to commonly assigned co-pending U.S. Patent Application disclosing a METHOD AND SYSTEM FOR THE DEVELOPMENT OF HIGH-ASSURANCE COMPUTING ELEMENTS, filed Jun. 6, 2007 as Express Mail Label No. EM 005 737 866 US and incorporated herein by reference.

FIELD OF THE INVENTION

This invention relates to the field of microprocessor design and, more specifically, efficient mechanisms for the design, simulation, verification and certification of high-assurance embedded microcode.

BACKGROUND OF THE INVENTION

The development of complex high-assurance platforms for commercial and military control systems, such as avionics and communications, and secure computing applications such as crypto modernization, guard applications and Multiple Independent Levels of Security (MILS) separation has generated a need for an efficient development and certification path for such high-assurance systems. To date, traditional approaches to the development and verification of microcode (also known as microprograms or firmware) for microprocessors have been labor intensive, error prone, and have lacked a formal specification for their implementation.

Such approaches have been based on textual specifications and implemented by hand-coding. Hand-coding is a labor intensive task requiring an individual intimately familiar with both the target architecture and the behavioral specifications of the desired microprogram. Verification has been performed through simulations which are driven by hand-generated test cases, corner case stimulus, or random input stimulus.

Further complicating this approach is the development of the simulation environment itself. In most cases, the development of the target microprocessor architecture (and the associated simulation platform) is a parallel effort with that of the development of the microcode. The simulation platform must be accurate at the gate and clock-cycle level to provide the microprogrammer with a faithful simulation tool. In order to accurately model register and gate level architecture of the target platform, the choice of simulation environments is often between a hardware description language (HDL) simulator intended for hardware development and a proprietary hand-coded software based simulator. Hand-coded software based simulators are oftentimes the preferred option as they may be specifically tailored to meet the needs of a microprogrammer.

To develop and certify high-assurance microcode, traditional approaches are inadequate due to the possibility of errors in specification interpretation, hand coding and incomplete test case coverage. In addition, the development time and cost associated with the simulation environment development may also be significant.

Achieving the Common Criteria for certain Evaluation Assurance Levels (EAL) requires the use of semi-formal or formal certification tools. For example, EAL 5 and 6 require semi-formal analysis while EAL 7 requires full formal analysis. Traditional approaches to microcoding fail to address these aspects of certification.

In addition, the artifacts and proofs of correctness necessary for the rigorous nature of high-assurance certification are not inherent to the development process and must be generated at the end of the design cycle.

As such, there is a need for efficient methods and systems for the development of certifiable high-assurance microcode which integrates current model-based design principles with automatic code generation of microcode and associated test cases, and automated analysis tools, such as model checkers and theorem provers. Such methods and systems provide designs having a documented pedigree of correctness.

SUMMARY OF THE INVENTION

Accordingly, the present invention is directed to a method for developing high-assurance microcode.

In an embodiment of the invention, a method for developing high-assurance microcode is disclosed. The method may comprise: (a) receiving a plurality of requirements detailing intended behavior of microcode (b) creating a model of microcode behavior; (c) generating microcode based on the model; (d) generating test cases based on the model; (e) simulating the behavior of the microcode; (f) translating the model into a verification tool-specific format; and (g) formally verifying the model using a verification tool.

In still a further embodiment of the invention, a computer-readable medium having computer readable instructions stored thereon for execution by a processor to perform a method, the method comprising the steps: (a) creating a model of microcode behavior; (b) generating microcode based on the model; (c) generating test cases based on the model; (d) simulating the behavior of the microcode; (e) translating the model into a verification tool-specific format; and (f) formally verifying the model using a verification tool.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying FIGURE in which.

DETAILED DESCRIPTION OF THE INVENTION

Figure 1:
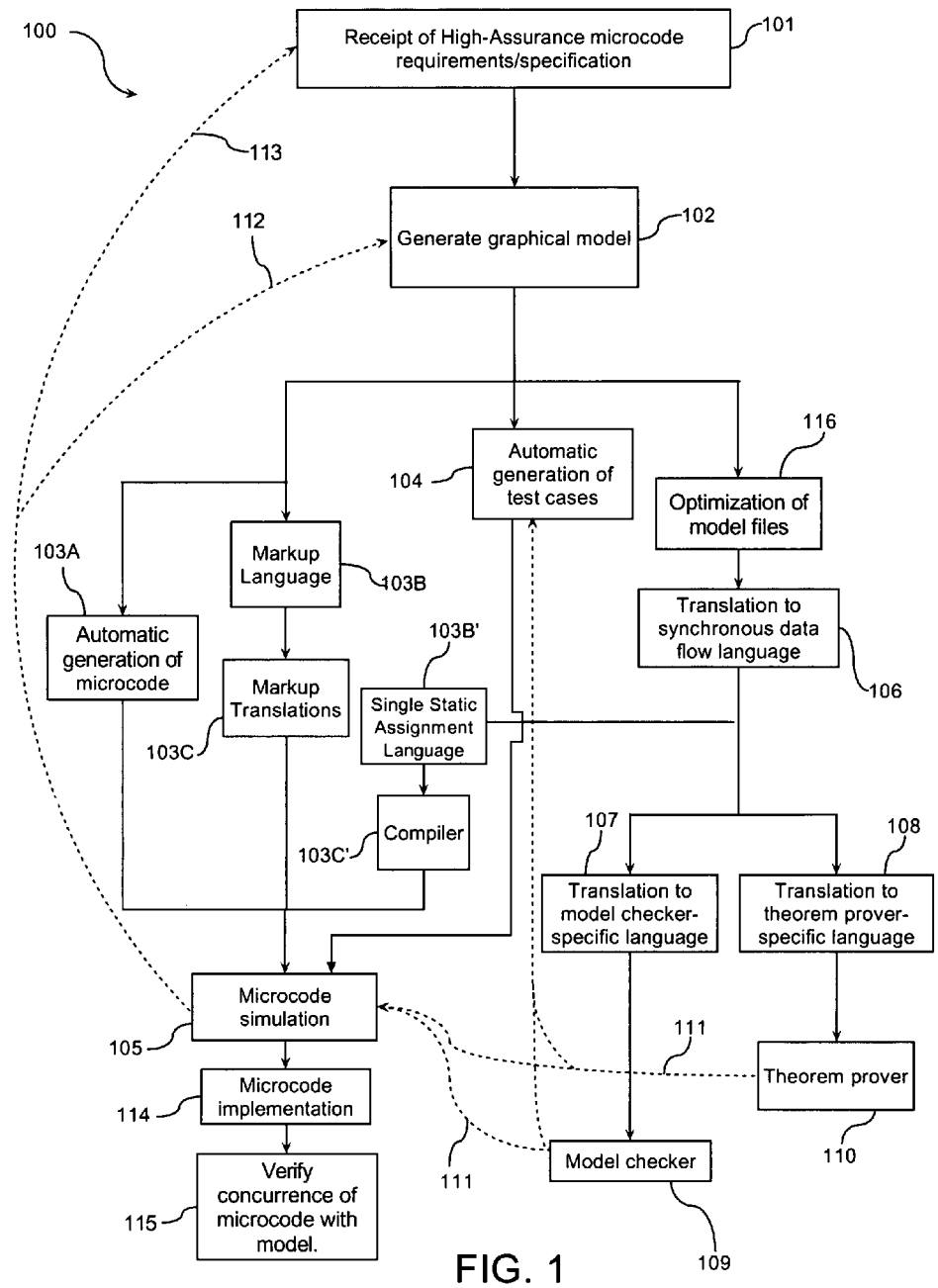
FIG. 1 depicts a flow diagram detailing a method for developing high-assurance microcode.

The following discussion is presented to enable a person skilled in the art to make and use the present teachings. Various modifications to the illustrated embodiments will be readily apparent to those skilled in the art, and the generic principles herein may be applied to other embodiments and applications without departing from the present teachings. Thus, the present teachings are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of the present teachings. Skilled artisans will recognize the examples provided herein have many useful alternatives and fall within the scope of the present teachings. Reference will now be made, in detail, to presently preferred embodiments of the invention.

Referring to FIG. 1, a flow diagram detailing a method for developing high-assurance microcode 100 is presented.

A text-based requirements/specification document detailing the specific feature set and functionality of high-assurance microcode is received at step 101. A requirement is a singular documented need of what a particular product or service should be or do and are commonly used in systems engineering or software engineering. The requirements phase may be broken down into requirements elicitation (gathering the requirements from stakeholders), analysis (checking for consistency and completeness), definition (writing down descriptive requirements for developers), and incorporation of multiple requirements into a specification (creating an initial bridge between requirements and design).

A graphical modeling tool may be utilized to model the functionality of high-assurance microcode in accordance with the requirements and specifications at step 102. For example, microcode can be modeled by using the commercially available program SIMULINK®, developed by THE MATHWORKS™, to model the desired microcode functionality. The SIMULINK® program, which runs in conjunction with the mathematical analysis tool MATLAB®, also developed by THE MATHWORKS™, can be used to model and develop control systems, signal processing systems and the like. The SIMULINK® program also offers simulation and prototyping capabilities. Models for simulating and analyzing real-world dynamic systems may be developed using the SIMULINK® program's block diagram interface. In the SIMULINK® program's block diagram interface, various blocks are used to represent input data, output data, functions that act on the data and the like. Additionally, specialized blocks and/or other tooling for specific applications can be developed or purchased from third party vendors. Such models may also be supplemented by further incorporating event-based, logical behavior modeling tools (such as the STATE-FLOW® program developed by THE MATHWORKS™) with the algorithmic behavior modeling tools, such as SIMULINK®.

Once a model is developed using the graphical modeling program, other implementation steps may be taken to translate the microcode model into a simulatable and synthesizable format. In one embodiment, the microcode is automatically generated from the model 102. Various mechanisms may be employed to automatically generate microcode from the graphical model at step 103. One such program is the Target Language Compiler functionality of the REAL-TIME WORKSHOP® program. The Target Language Compiler program examines the model and determines what computer code needs to be generated to convert the model into a software-defined design based on the different algorithm functional blocks as specified by the model. A microcode generator program then generates the microcode corresponding to those blocks at step 103A. The microcode may be ANSI compatible C or C++ code although computer code in any other programming language, such as Pascal, Java, Fortran, ADA, Verilog, and the like, can also be generated, depending on the capability of the code generator program and the needs of the user.

In further embodiments, an intermediate language representation of the model developed at step 102 may be generated at step 103B. The intermediate language 103B may then be translated and/or compiled into the target microcode at step 103C. For example, a markup language and corresponding markup language transformations may be used to accomplish the intermediate language generation 103B and translation 103C. Markup languages combine text and extra information about that text into the body of a markup language file. The extra information, for example about the text's structure or presentation, is expressed using markups, which are intermingled with the primary text. Exemplary markup languages include the Extensible Markup Language (XML), Hypertext Markup Language (HTML) and Extensible Hypertext Markup Language (XHTML).

Translation from the modeling language to an mark-up language may involve the creation of a document type definition (DTD). A DTD defines the legal building blocks of an mark-up language document by specifying the document structure with a list of legal elements and attributes. Once a DTD representing the abstract syntax tree for the modeling language has been established, modeling source language may be parsed into an mark-up language representation by adding the appropriate mark-up language tags.

Following generation of an intermediate mark-up language representation of the modeled microcode at step 103B, the mark-up language representation may be compiled into a microcode representation at step 103C. Mechanisms for such compilations include the use of the markup language translations, such as extensible stylesheet language transformations (XSLT).

In still a further embodiment, the intermediate language 103B' may be a static single assignment (SSA) form intermediate language. Translation to such languages may be readily accomplished from formalized synchronous data flow programming languages, such as LUSTRE. Such formalized synchronous data flow programming language representation of the modeled microcode 106 may be incorporated as an intermediate language in a formal mathematical verification process (as will be discussed below). Therefore, translation of existing formalized synchronous data flow programming language into an SSA form language provides a path to an efficient use of resources in the implementation steps 103 for the microcode.

The translation from a synchronous data flow language such as LUSTRE to SSA is aided by the fact that SSA form is equivalent to a functional programming language. (See "SSA is Functional Programming" by Andrew Appel, ACM SIGPLAN Notices, vol. 33, no. 4, pp. 17-20, April 1998). As such, translating from LUSTRE to SSA is reduced to the problem of translating from one functional programming language to another. Such translations are well understood in the art.

Following translation of the formalized synchronous data flow programming language into an SAS form language 103B', the SAS form language may be compiled into a microcode representation at step 103C'. Mechanisms for such compilations include the use of the "backend" of the GNU Compiler Collection (GCC) compiler program. The GNU backend includes functionality which translates intermediate SSA code into a register transfer level (RTL) description which it may then convert into assembly language level microcode instructions.

Automatic code generation from the graphical model leads to a reduction in coding errors and the reduction in development cycle time. In addition, any changes in the requirements or specification can be implemented in the model and the corresponding code regenerated with little additional effort. Such an iterative development mechanism provides for additional time and cost savings. Further, long-term high-assurance benefits arise from the reuse of previously certified models (and the associated generated code) and the corresponding reduction in verification due to the certified behavioral characteristics of those models.

Additionally, formal verification of the graphical model may also be conducted as a parallel process with the implementation of the high-assurance microcode. In the context of hardware and software systems, formal verification is the act of proving or disproving the correctness of intended algorithms underlying a system with respect to a certain formal specification or property, using formal mathematical methods. Such methods differ from current microcode verification methods which are merely directed at maximizing test-case coverage of the state space.

The graphical model of the high-assurance microcode generated at step 102 may provide the input to an automatic test-case generation mechanism, such as the REACTIS® line of products developed by Reactive Systems at step 104. REACTIS® employs a two-pronged approach including test-generation and test-validation.

The test-generation component of REACTIS® relies on model coverage criteria to construct tests. The coverage criteria include generic concepts such as decision, condition, and modified condition/decision coverage (MC/DC); SIMULINK®-specific metrics such as branch and subsystem; and/or STATEFLOW®-specific metrics such as state, condition-action and transition-action. The model-validation component of REACTIS® uses a "test and check" approach for verifying models. Users first supplement their models with checks that monitor whether model behavior is consistent with expectations. The model-validation component then uses the test-cases created by the test-generation component to determine if any of the user-defined checks can be violated. These tests can then be used to diagnose the cause of any abnormal behavior that may be detected.

The microcode previously generated at step 103 and the test case vectors generated at step 104 may be input into a simulation tool 105 to allow for the observation of the behavior of the modeled microcode. Simulation provides a mechanism for determining whether the present implementation of the high-assurance microcode effectively achieves the requirements set forth in the specification. As the automatically generated test cases ensure extensive coverage of the state space, the simulation step will reveal most, but not all defects in the circuit.

However, the present invention provides further assurances that all defects will be accounted for by incorporating formal mathematical methods to further verify the microcode.

The graphical model may be further verified by translating the graphical model into a verifiable, formalized synchronous data flow programming language, such as LUSTRE at step 106. Such data flow languages have several merits. They have relatively simple syntax and semantics and provide completely functional models without side effects. These features make such languages well-suited to formal verification and subsequent program transformation. It also facilitates reuse as a side-effect free module which will behave the same way in any context into which it is embedded. Also, synchronous data flow languages are naturally parallel in nature, in which the only constraints on parallelism are enforced by the data-dependencies between variables. This allows for parallel implementations to be realized, either in software, or directly in hardware.

These advantages also make such synchronous data flow languages a convenient source language for any subsequent transformations. They are highly conducive to re-translation into other languages thereby providing an effective intermediate representation when multiple subsequent transformations are contemplated.

Specifically, the LUSTRE language is based on sequences (possibly infinite in length) of values (e.g. sequence S having values $s_0, s_1, s_2, s_3 \ldots s_n$) of a given type where each of the values in the sequence is individually associated with a given arbitrary time-increment of a sequential clock value. A more detailed description of the LUSTRE language may be found in *The Synchronous Data Flow Programming Language LUSTRE*, Halbwacks et. al, *Proceedings of the IEEE*, Vol. 79, No. 9, September 1991, incorporated herein by reference.

The translation of the graphical model into a synchronous program at step 106 can be viewed, simply, as the generation of a set of input variables and assignment equations of the form $\{x_0 = E_0, x_1 = E_1, \ldots, x_n = En\}$ that must be acyclic in terms of data dependencies. This translation from the graphical model to a synchronous program may account for one or more of the following factors: lexical attributes, types, constants, variables and equations, and (specific to LUSTRE), the handling of flows, clocks, nodes and expressions. There is an immediate correspondence between SIMULINK® primitive blocks and LUSTRE equations, and a similar correspondence between SIMULINK® subsystems and LUSTRE nodes, allowing a straightforward translation from the discrete subset of SIMULINK® objects into LUSTRE.

The translation of state machine graphical models, such as STATEFLOW®, into a synchronous program at step 106 involves creating state variables representing the states, junctions, variables, events, and functions in a synchronous program. The translation encodes the transitions and actions in the state machine as equations that update the state variables. Because state machines closely correspond to an imperative language, they are strictly more computationally powerful than synchronous languages, and so it is only possible to translate models that meet certain syntactic restrictions. A sufficient restriction is that there are no broadcast events and that there are no cycles in the directed event/state graph; i.e., if state X can broadcast an event to state Y, then state Y cannot broadcast an event to state X. A more detailed description of this translation process can be found in "*Defining and Translating a 'Safe' Subset of SIMULINK®/STATEFLOW® into LUSTRE*", N. Scaife et. al, 4th ACM International Conference on Embedded Software (EMSOFT'04), Pisa, Italy, September 2004.

Additionally, an intermediate translation step may be incorporated into the inventive method so as to simplify further subsequent translations. The model files generated at step 102 (e.g. .mdl-type files generated by the SIMULINK® program) will also necessarily include graphical elements corresponding to the user interface portion of the model. Such elements are not required for the formal mathematical certification methods of the present invention and the presence of such elements impedes the parsing of such files into synchronous data flow languages. In order to further optimize 116 the process, it may be desirable to remove such superfluous graphical elements from the model files prior to translation into a synchronous data flow language. For example, the REACTIS® program referenced above regarding automatic test case generation may also be used to provide a desirable intermediate representation of the model which does not include such graphical elements. Further, various other application programming interfaces (API) may be provided as add-ons to the modeling mechanism 102 (e.g. a SIMULINK® API) which provide specifically optimized 116 model representations for use by other platforms. Such APIs may be incorporated without departing from the scope of the invention.

The mathematically verifiable representation embodied in the synchronous program may be translated into a verification tool-specific format at steps 107 or 108. As previously discussed, synchronous programming languages such as LUSTRE provide an effective intermediate representation when multiple subsequent transformations are to be carried out on the synchronous code, as in the case of the present invention.

Possible verification tools which may be incorporated into the present invention include, but are not limited too, model checkers, such as the PROVER® line of products (developed by Prover Technology) or the open-source NuSMV2 (developed as a joint project between L'Istituto Trentino di Cultura, Il centro per la Ricerca Scientifica e Tecnologica [ITC-IRST] in Trento, Italy, Carnegie Mellon University, the University of Genoa and the University of Trento), or theorem provers, such as ACL2 (developed by Kaufmann and Moore of the University of Texas).

Such verification tools require differing input formats. For example, the ACL2 theorem prover is a Lisp-based computer program that can take Lisp-based mathematical formulas as input and provides mathematical proofs thereof. Further documentation regarding the ACL2 theorem prover may be found in "*How to Prove Theorems Formally*", Matt Kauffman and J Strother Moore, http://www.cs.utexas.edu/users/moore/publications/how-to-prove-thms/main.pdf, incorporated herein by reference Alternatively, the NuSMV model checker is an SMV-based model checker which accepts SMV-based programs as input. Further documentation regarding the NuSMV model checker may be found in the "*NuSMV 2.4 Users Guide*", Roberto Cavada, Alessandro Cimatti, Charles Arthur Jochim, Gavin Keighren, Emanuele Olivetti, Marco Pistore, Marco Roveri and Andrei Tchaltsev, http://nusmv.irst.itc.it/NuSMV/userman/v24/nusmv.pdf.

Additionally, other supported back-end languages for various target verification tools may include, but are not limited to C, JAVA, PVS, Spy, Cryptol and SAL, among others.

Translation into a compatible verification tool-specific format may account for one or more of the following factors: lexical attributes, types (e.g. scalar, tuple, and composite assignment conversions), constants, variables and equations, initial-instant functionality, flows, clocks, nodes and expressions (e.g. if-then-else/case statements).

Prior to its input into either a model checker or theorem prover, the translation of the mathematically verifiable synchronous program representation of steps 107 and 108 may be optimized to account for the nature of the particular verification tool. For theorem provers, it is desirable to have a high level of traceability between the synchronous program representation and the graphical model. As such, extensive commenting may be provided within the synchronous program representations (and the resulting verification tool-specific translations). Also, simplifications such as the propagation of constant expressions may be preformed. In the case of model checkers, more extensive transformations may be required. Possible optimizations may include constant propagation, duplicate variable elimination, inlining, hierarchy flattening, program slicing or register minimization.

Following such optimizations, the translated synchronous program may be provided to a model checker at step 109 and/or a theorem prover at step 110 for formal verification.

The NuSMV model checker shown at step 109 is an SMV-based program that takes SMV-based input programs. NuSMV allows for the representation of synchronous and asynchronous finite state systems, and for the analysis of specifications expressed in Computation Tree Logic (CTL) and Linear Temporal Logic (LTL), using binary decision diagram (BDD)-based and Boolean satisfiability (SAT)-based model checking techniques. Heuristics are available for achieving efficiency and partially controlling the state explosion. The interaction with the user can be carried on with a textual interface, as well as in batch mode.

During the verification step 109, the formal verification/model checking tools attempt to show an instance of a property (i.e. a relation, either logical (Boolean) or temporal) between one or more signals in the microcode design or the ability or non-ability to reach a specified state which demonstrates the existence of a contradiction. If a contradiction exists, the given property does not hold (i.e. the property is disproved). For example, a model checker may be provided a given property or state X which is to be strictly avoided. If there exists any path that will reach state X, the model checker will generate a counter-example to this property in which state X is reached. Reachability properties can be automatically generated for different levels of coverage.

The verification tools check the microcode design and produce certain diagnostic information 111. In the case of model checkers, this diagnostic information may comprise a counter-example to indicate an existence of a contradiction. A counter-example is typically a test sequence of inputs that disproves a property.

Further, as previously discussed and shown at step 110, the ACL2 theorem prover is a Lisp-based computer program that can take Lisp-based mathematical formulas as input and provides mathematical proofs thereof. It employs proof techniques such as rewriting, decision procedures, and mathematical induction, among others to automatically prove theorems in a first-order mathematical theory of recursively defined functions and inductively constructed objects, through the use of an arithmetic lemma library. As with the model checker above, the theorem prover may provide diagnostic information 111 which indicates the outcome of the theorem prover operations.

The diagnostic information 111 provided by verification steps 109 and 110 may be routed back to either the test-case generation step 104 or directly to the microcode simulation step 105 to observe the effect that a counter-example or other diagnostic information 111 has on the current implementation of the microcode embodied in the graphical model.

These observations may be analyzed so as to refine the underlying design to account for the diagnostic information 111. The required modifications based on the observational data 112 may be incorporated into the graphical model so as to correct the microcode behavior to correspond with the specification/requirements 101.

Alternately, the diagnostic information 111 may demonstrate a requirements deficiency where the underlying project parameters do not reflect the intended microcode functionality. In such a case, the observed behavior of the microcode 113 in response to the diagnostic information 111 may be incorporated into the requirements/specification step 101 so as to correctly identify the desired functionality.

Through use of these iterative, high-assurance development methods of simulation and verification of the microcode model, the absence of any additional counter examples or unrealized algorithmic paths may eventually be demonstrated. At that point, high-assurance microcode may be implemented based on the graphical model at step 114. The microcode may be embedded in a hardware device as a read-only memory (ROM) integrated circuit, erasable programmable read-only memory (EPROM) chip, or electrically erasable programmable read-only memory (EEPROM) chip, or other firmware implementation common to the art.

Finally, the behavior of the embedded microcode may be compared to the modeled design developed at step 102 so as to verify their concurrence at step 115.

The forgoing method and system will ensure the production of high-assurance microcode having a documented pedigree of correctness as embodied in artifacts generated therein, specifically the mathematical proofs and associated certified simulation outputs.

It is believed that the present invention and many of its attendant advantages will be understood from the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for designing high-assurance microcode, the method comprising the steps:
   receiving a plurality of requirements detailing intended behavior of a circuit;
   creating a model of microcode behavior;
   generating microcode based on the model;
   generating test cases based on the model;
   simulating the behavior of the microcode;
   translating the model into a synchronous program;
   translating the synchronous program into a verification tool-specific format; and
   formally verifying the model using a verification tool.

2. The method of claim 1,
   wherein the generation of microcode comprises the steps:
   translating the model into an intermediate language;
   translating the intermediate language into microcode.

3. The method of claim 2,
   wherein the intermediate language is a markup language.

4. The method of claim 2,
   wherein the intermediate language is a static single assignment language.

5. The method of claim 1,
   further comprising the step:
   embedding the microcode in a device.

6. The method of claim 1, wherein the creation of the model is carried out in a graphical design environment.

7. The method of claim 1, wherein the verification tool is a model checker.

8. The method of claim 1,
   wherein the verification tool is a theorem prover.

9. A computer-readable medium having computer readable instructions stored thereon for execution by a processor to perform a method, the method comprising:
   creating a model of microcode behavior;
   generating microcode based on the model;
   generating test cases based on the model;
   simulating the behavior of the microcode;
   translating the model into a synchronous program;
   translating the synchronous program into a verification tool-specific format; and
   formally verifying the model using a verification tool.

10. The computer-readable medium of claim 9, wherein the generation of microcode comprises the steps:
    translating the model into an intermediate language;
    translating the intermediate language into microcode.

11. The computer-readable medium of claim 10, wherein the intermediate language is a markup language.

12. The computer-readable medium of claim 10, wherein the intermediate language is a static single assignment language.

13. The computer-readable medium of claim 9, wherein the creation of the model is carried out in a graphical design environment.

14. The computer-readable medium of claim 9, wherein the verification tool-specific format is a theorem prover language.

15. The computer-readable medium of claim 9,
    wherein the verification tool-specific format is a model checker language.

16. A system for designing high-assurance microcode comprising:
    modeling means for creating a model of a high-assurance circuit;
    microcode generation means for generating microcode based on the model;
    circuit simulation means for simulating the behavior of the circuit from the microcode;
    test case generation means for generating test cases based on the model;
    first translation means for translating the model into a synchronous program;
    second translation means for translating the synchronous program into a verification tool-specific format; and
    verification means for formally verifying the model using a verification tool.

17. The system of claim 16, wherein the microcode generating means further comprises:
    means for translating the model into an intermediate language; and
    means for translating the intermediate language into microcode.

18. The system of claim 17, wherein the intermediate language is a markup language.

19. The system of claim 17, wherein the intermediate language is a static single assignment language.

20. The system of claim 16, wherein the verification tool-specific format is a theorem prover language.

21. The system of claim 16, wherein the verification tool-specific format is a model checker language.

22. The system of claim 16, further comprising: means for embedding microcode in a device.

* * * * *